(12) United States Patent
Maeda

(10) Patent No.: US 10,620,519 B2
(45) Date of Patent: Apr. 14, 2020

(54) IMAGE PROJECTION APPARATUS

(71) Applicant: CANON KABUSHIKI KAISHA, Tokyo (JP)

(72) Inventor: Yuuki Maeda, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/057,376

(22) Filed: Aug. 7, 2018

(65) Prior Publication Data

US 2019/0049833 A1    Feb. 14, 2019

(30) Foreign Application Priority Data

Aug. 10, 2017 (JP) .................. 2017-155446

(51) Int. Cl.
| | | |
|---|---|---|
| *G03B 21/20* | (2006.01) | |
| *H04N 9/31* | (2006.01) | |
| *G03B 33/12* | (2006.01) | |
| *G03B 21/00* | (2006.01) | |

(52) U.S. Cl.
CPC ....... *G03B 21/2053* (2013.01); *G03B 21/006* (2013.01); *G03B 21/008* (2013.01); *G03B 21/2066* (2013.01); *G03B 21/2073* (2013.01); *G03B 33/12* (2013.01); *H04N 9/3126* (2013.01); *G03B 21/2033* (2013.01)

(58) Field of Classification Search
CPC .............. G03B 21/2053; G03B 21/006; G03B 21/008; G03B 21/2066; G03B 33/12; G03B 21/2033; G03B 21/202; G03B 21/20206; H04N 9/3105; H04N 9/3126
See application file for complete search history.

(56) References Cited

U.S. PATENT DOCUMENTS

| | | | | |
|---|---|---|---|---|
| 7,234,822 B2* | 6/2007 | Uchiyama | ............... | H04N 9/315 |
| | | | | 348/E9.027 |
| 2007/0229718 A1* | 10/2007 | Hall, Jr. | ............... | H04N 5/7416 |
| | | | | 348/744 |
| 2011/0261272 A1* | 10/2011 | Kotani | ............... | G02B 27/1046 |
| | | | | 348/789 |
| 2018/0024429 A1* | 1/2018 | Dewald | ................... | G02B 5/04 |
| | | | | 353/81 |

FOREIGN PATENT DOCUMENTS

| | | |
|---|---|---|
| JP | 2007-121693 A | 5/2007 |
| JP | 2016-039429 A | 3/2016 |

* cited by examiner

*Primary Examiner* — Ryan D Howard
(74) *Attorney, Agent, or Firm* — Canon USA, Inc., IP Division

(57) ABSTRACT

An image projection apparatus includes a light source unit emitting illumination light, a first optical modulation unit, a second optical modulation unit, a third optical modulation unit, a fourth optical modulation unit, a color separating-combining system, and an illumination optical system. The illumination optical system includes a polarization conversion unit and a reflection unit including a mirror arranged on a position different from that of the polarization conversion unit on an optical path from the light source unit to the fourth optical modulation unit and a mirror arranged on an optical path from the fourth optical modulation unit to the front side color separating unit.

13 Claims, 13 Drawing Sheets

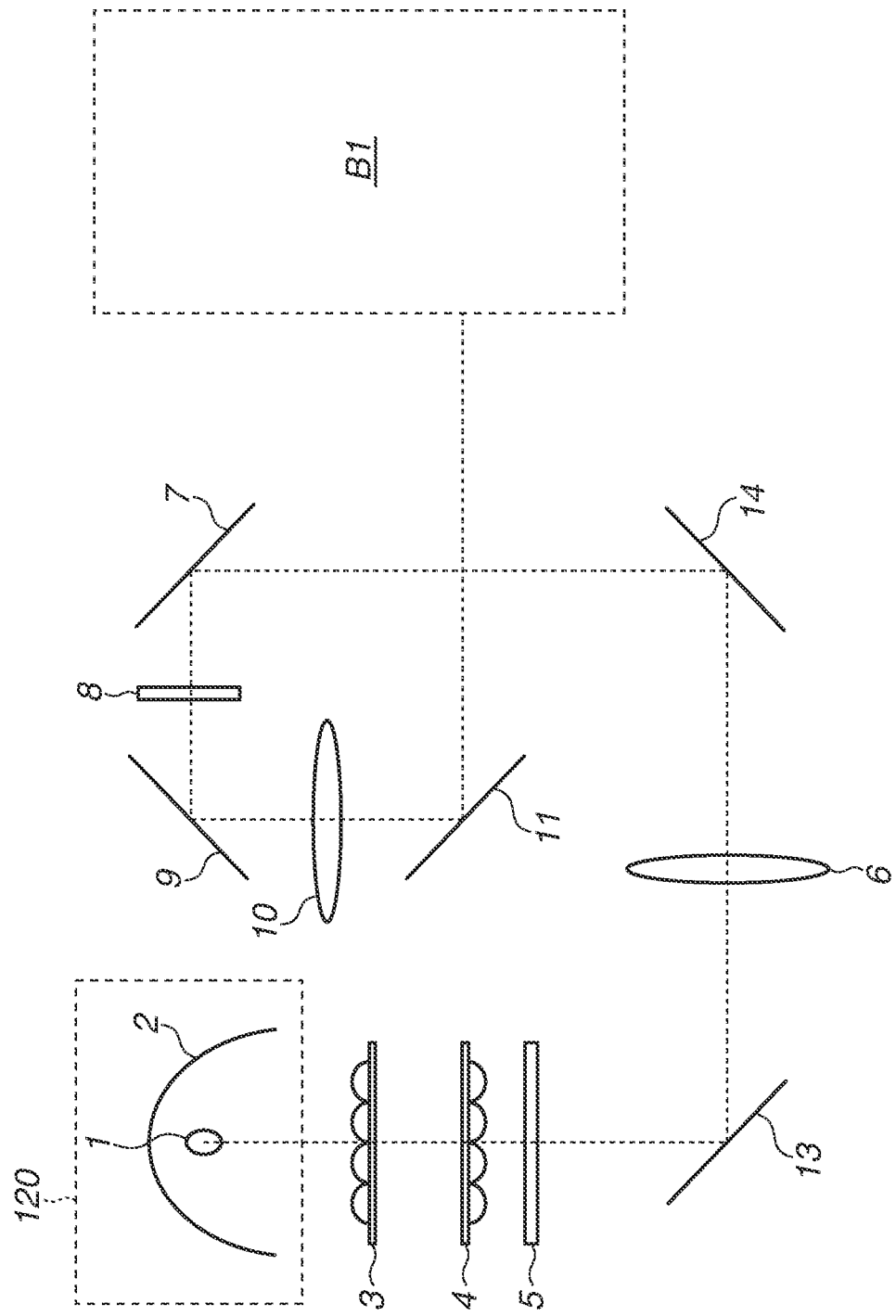

IMAGE PROJECTION APPARATUS

BACKGROUND

Field of the Disclosure

The present disclosure generally relates to imaging and, more particularly, to an image projection apparatus.

Description of the Related Art

Projectors (image projection apparatuses) used for flight simulators for night takeoff and landing training involve higher contrast than conventional ones for more realistically reproducing situations at night in which surroundings are dark, but guide lights on runways are lit. As such a projector capable of realizing higher contrast than the conventional ones, a projector described in Japanese Patent Application Laid-Open No. 2007-121693 is known.

The projector described in Japanese Patent Application Laid-Open No. 2007-121693 is provided with a fourth liquid crystal panel installed between an illumination optical system and a color separating-combining system in addition to liquid crystal panels for red light, green light, and blue light for image formation. For example, when the projector projects an image in which a center portion is bright and a peripheral portion is dark, the fourth liquid crystal panel modulates light from a light source unit so that only center light in the light from the light source unit entering the fourth liquid crystal panel travels from the fourth liquid crystal panel toward the liquid crystal panels of the respective colors.

Accordingly, only the light of the center portion enters the liquid crystal panels of the respective colors, and it can suppress contrast to be lowered because the light of the peripheral portion desired to be darkly displayed is projected on a screen. The projector described in Japanese Patent Application Laid-Open No. 2007-121693 can realize higher contrast than the conventional technique based on the above-described principle.

In Japanese Patent Application Laid-Open No. 2007-121693, a configuration including the above-described fourth liquid crystal panel is described in which light from the fourth liquid crystal panel is reflected by a reflecting mirror and guided to the color separating-combining system. In the configuration, the light source unit, the fourth liquid crystal panel, and the reflecting mirror arranged on a straight line, so that the projector includes a rectangular space therein for accommodating each part on an optical path from the light source unit to the reflecting mirror via the fourth liquid crystal panel.

In addition, the configuration may increase a size of the projector when that the above-described rectangular space cannot be secured because of arrangement of a power source unit, a control board, a cooling apparatus, and the like, and a cover of the projector is enlarged to secure the above-described rectangular space.

SUMMARY

The present disclosure is directed to the provision of an image projection apparatus capable of realizing higher contrast than a conventional technique and suppressing increase in a size.

In one or more aspects of the present disclosure, an image projection apparatus includes a light source unit configured to emit illumination light including first color light, second color light, and third color light of which wavelengths are different from each other, a first optical modulation unit configured to modulate the first color light, a second optical modulation unit configured to modulate the second color light, a third optical modulation unit configured to modulate the third color light, a fourth optical modulation unit as a transmissive liquid crystal panel unit configured to modulate the illumination light, a color separating-combining system configured to guide the first color light to the first optical modulation unit, to guide the second color light to the second optical modulation unit, to guide the third color light to the third optical modulation unit, and to combine the light from the first optical modulation unit, the light from the second optical modulation unit, and the light from the third optical modulation unit, and an illumination optical system configured to illuminate the fourth optical modulation unit with the illumination light and to guide light from the fourth optical modulation unit to the color separating-combining system, wherein, in a case where a color separating unit arranged on a most light source unit side on an optical path from the light source unit to the color separating-combining system in color separating units included in the color separating-combining system is regarded as a front side color separating unit, the illumination optical system includes a polarization conversion unit configured to convert a polarization direction of the illumination light from the light source unit into a predetermined polarization direction and a reflection unit including a mirror arranged on a position different from that of the polarization conversion unit on an optical path from the light source unit to the fourth optical modulation unit and a mirror arranged on an optical path from the fourth optical modulation unit to the front side color separating unit.

Further features of the present disclosure will become apparent from the following description of exemplary embodiments with reference to the attached drawings.

BRIEF DESCRIPTION OF THE DRAWINGS

FIG. 5 illustrates a configuration of an image projection apparatus according to a fourth modification of the first exemplary embodiment.

DESCRIPTION OF THE EMBODIMENTS

Figure 1:
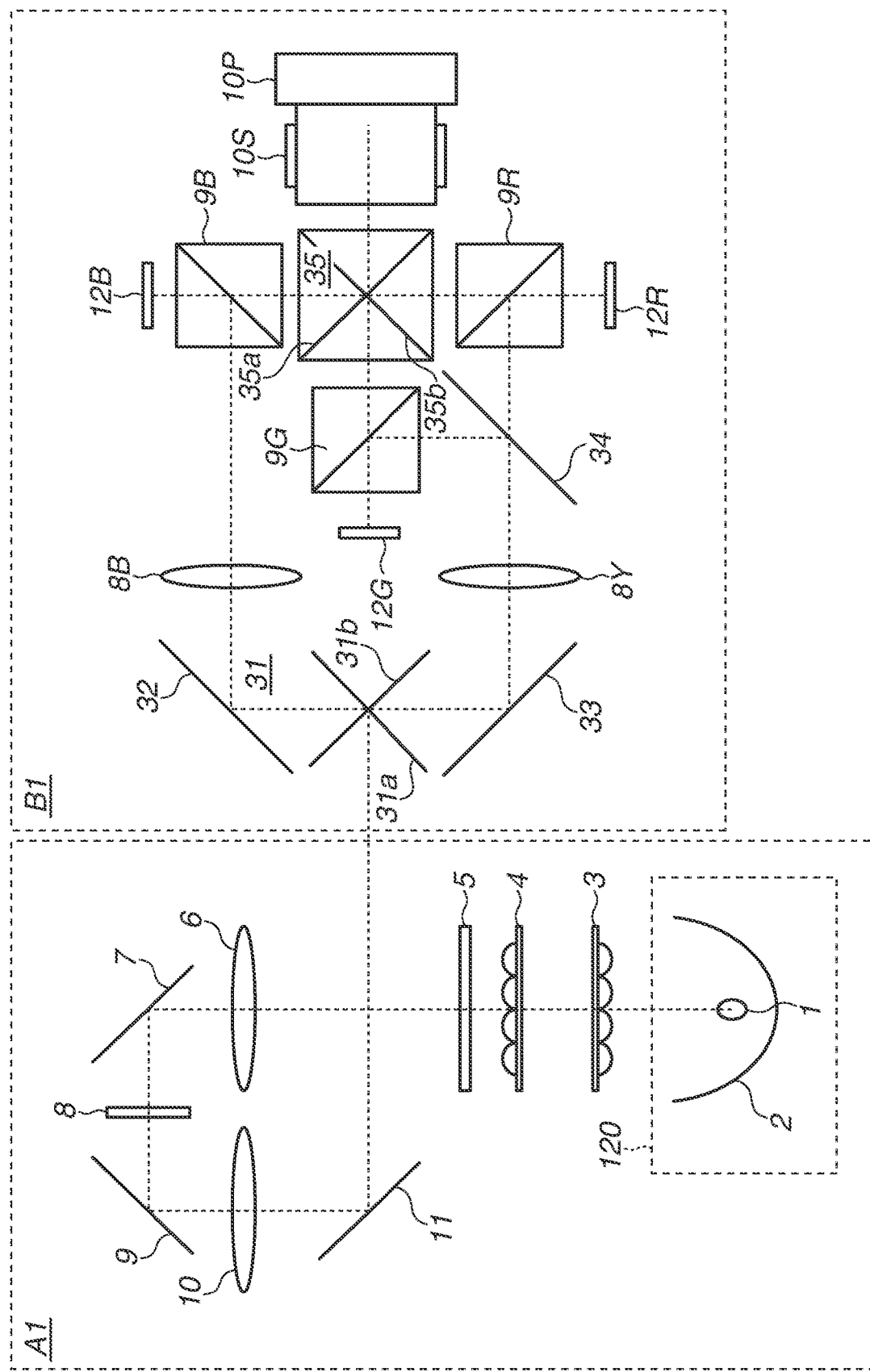
FIG. 1 illustrates a configuration of an image projection apparatus according to a first exemplary embodiment.

Various exemplary embodiments, features, and aspects of the present disclosure will be described below with reference to the attached drawings. However, the present disclosure is not limited to the embodiments described below.

A configuration of a projector (an image projection apparatus) according to a first exemplary embodiment of the present disclosure is described with reference to FIG. 1.

The projector according to the present exemplary embodiment includes a light source unit, an illumination optical system, a color separating-combining system, a plurality of optical modulation units, and a holding unit for a projection optical system. In FIG. 1, the light source unit, the illumination optical system, and a fourth optical modulation unit are collectively referred to as a configuration A1, and the color separating-combining system, first to third optical modulation units, and the holding unit for the projection optical system are collectively referred to as a configuration B1. Each unit and each system are described in detail below.

The units described throughout the present disclosure are exemplary and/or preferable modules for implementing processes described in the present disclosure. The term "unit", as used herein, may generally refer to firmware, software, hardware, or other component, such as one or more processors, one or more memories, circuitry or the like, or any combination thereof, that is used to effectuate a purpose. The modules can be hardware units (such as circuitry, firmware, a field programmable gate array, a digital signal processor, an application specific integrated circuit or the like) and/or software modules (such as a computer readable program or the like). The modules for implementing the various steps are not described exhaustively above. However, where there is a step of performing a certain process, there may be a corresponding functional module or unit (implemented by hardware and/or software) for implementing the same process. Technical solutions by all combinations of steps described and units corresponding to these steps are included in the present disclosure.

(Configuration of Light Source Unit)

A light source unit 120 is a high pressure mercury lamp including a paraboloid reflector 2 and a light emission tube 1. A plurality of light beams emitted to various directions from the light emission tube 1 are collimated by the paraboloid reflector 2 and directed toward the illumination optical system.

A solid-state light source unit may be used as the light source unit instead of the high pressure mercury lamp. The solid-state light source unit mentioned here is a light source unit including a blue laser diode (LD) emitting blue light and a yellow phosphor for converting a part of the blue light from the blue LD into yellow light. Alternatively, the solid-state light source unit is a light source unit including a solid-state light source like a light source unit including a blue LD, a red LD, and a green LD.

In other words, the light source unit according to each exemplary embodiment in the present disclosure may be a high pressure mercury lamp or a solid-state light source unit as long as capable of emitting illumination light including first color light, second color light, and third color light of which wavelengths are different from each other.

(Configuration of Illumination Optical System and Fourth Optical Modulation Unit)

The illumination optical system includes a first fly-eye lens array 3, a second fly-eye lens array 4, a polarization conversion unit 5, a first condenser lens 6, and a first mirror 7 which are arranged on an optical path from the light source unit 120 to a fourth optical modulation unit 8. The illumination optical system further includes a second mirror 9, a second condenser lens 10, and a third mirror 11 arranged on an optical path from the fourth optical modulation unit 8 to a cross dichroic mirror 31. According to the present exemplary embodiment, the first mirror 7, the second mirror 9, and the third mirror 11 correspond to a reflection unit.

Illumination light from the light source unit 120 is split into a plurality of light beams by the first fly-eye lens array 3. The plurality of light beams split by the first fly-eye lens array 3 transmits the second fly-eye lens array 4 and forms a plurality of light source images in the vicinity of the polarization conversion unit 5. The polarization conversion unit 5 has a function of converting a polarization direction of the illumination light from the light source unit 120 to a predetermined direction. The light from the polarization conversion unit 5 lights the fourth optical modulation unit 8 via the first condenser lens 6 and the first mirror 7. The fourth optical modulation unit 8 is a transmissive optical modulation unit, more specifically, a transmissive liquid crystal panel unit.

The fourth optical modulation unit 8 modulates the illumination light from the light source unit 120 based on an image signal from a computerized configuration(s) or the like, that may include one or more processors and one or more memories, connected to the projector. A case is described when the projector projects an image in which a center portion is bright and a peripheral portion is dark. In this case, the fourth optical modulation unit 8 modulates the illumination light from the light source unit 120 so that, in the illumination light from the light source unit 120, light entering a center portion of the fourth optical modulation unit 8 is guided to the first to the third optical modulation units, and light entering a peripheral portion of the fourth optical modulation unit 8 is returned to the light source unit 120. Accordingly, only center portions of the first to the third optical modulation units are illuminated in the first to the third optical modulation units, and it can suppress contrast to be lowered because the light of the peripheral portions originally desired to be darkly displayed is projected on a screen. The projector described in the present exemplary embodiment can realize higher contrast than a conventional technique by the above-described principle.

The light directed to a direction different from the fourth optical modulation unit 8 to the light source unit 120 enters the cross dichroic mirror 31 via the second mirror 9, the second condenser lens 10, and the third mirror 11. In other words, according to the present exemplary embodiment, the illumination optical system includes the first mirror 7 arranged on the optical path from the light source unit 120 to the fourth optical modulation unit 8 and the second mirror 9 arranged on the optical path from the fourth optical modulation unit 8 to the cross dichroic mirror 31.

When the illumination optical system does not include the first mirror 7 and the second mirror 9, an optical path from the light source unit 120 to the cross dichroic mirror 31 via the fourth optical modulation unit 8 will be a straight line. In this case, a large rectangular space extending in a certain direction may be implemented to arrange each optical element provided on the optical path from the light source unit 120 to the cross dichroic mirror 31. Generally, a power source unit, a control board, a cooling apparatus, and the like are arranged in the projector other than the optical elements, and thus it is difficult to secure the above-described rectangular space while fixing a size of the projector. When the illumination optical system does not include the first mirror 7 and the second mirror 9, it can be considered to secure the above-described rectangular space by increasing the size of the projector, however, the projector is enlarged in this case.

With respect to enlargement of the projector, according to the projector described in the present exemplary embodiment, the illumination optical system includes the first mirror 7 and the second mirror 9 as described above, and thus the optical path from the light source unit 120 to the cross dichroic mirror 31 is not a straight line. In other words, the projector described in the present exemplary embodiment does not need the above-described large rectangular space, and thus the projector can realize higher contrast than a conventional technique and also suppress increase in a size. For example, when contrast in the fourth optical modulation unit 8 is 500:1, and contrast in the first to the third optical modulation units described below is 5000:1, the image projection apparatus can realize contrast of 2.5 million:1 as a whole.

(Configuration of Color Separating-Combining System and First to Third Optical Modulation Units)

The light directed from the third mirror 11 to the color separating-combining system first enters the cross dichroic mirror 31. In other words, when a color separating unit located most closely to the light source unit side in color separating units included in the color separating-combining system on an optical path from the light source unit to the color separating-combining system is referred to as a front side color separating unit, according to the present exemplary embodiment, the cross dichroic mirror 31 is the front side color separating unit. The cross dichroic mirror 31 includes a first dichroic mirror 31a which transmits red light and green light and reflects blue light and a second dichroic mirror 31b which transmits blue light and reflects red light and green light.

(Optical Path of Blue Light)

The blue light from the first dichroic mirror 31a enters a blue light polarization beam splitter (PBS) 9B via a blue light mirror 32 and a blue light condenser lens 8B. A polarization direction of the blue light entering the blue light PBS 9B from the light source unit 120 is converted by the above-described polarization conversion unit 5 to a direction reflected by the blue light PBS 9B. Thus, the blue light entering the blue light PBS 9B from the light source unit 120 is reflected by the blue light PBS 9B and enters a first optical modulation unit 12B. In other words, the first optical modulation unit 12B is an optical modulation unit for the blue light.

The blue light entering the first optical modulation unit 12B is modulated based on an image signal from the computer and the like connected to the projector. The blue light modulated by the first optical modulation unit 12B to be guided to the screen enters a combining prism 35 via the blue light PBS 9B. The combining prism 35 includes a first dichroic film 35a which reflects the blue light and transmits the green light and the red light and a second dichroic film 35b which transmits the blue light and the green light and reflects the red light. Thus, the blue light entering the combining prism 35 from the first optical modulation unit 12B is guided to a projection optical system 10P by the combining prism 35.

(Optical Path of Green Light)

The green light from the first dichroic mirror 31a enters a green light PBS 9G via a green light and red light mirror 33, a green light and red light condenser lens 8Y, and a green light and red light dichroic mirror 34. The green light and red light dichroic mirror 34 has a property of reflecting the green light and transmitting the red light. A polarization direction of the green light entering the green light PBS 9G from the light source unit 120 is converted by the above-described polarization conversion unit 5 to a direction reflected by the green light PBS 9G. Thus, the green light entering the green light PBS 9G from the light source unit 120 is reflected by the green light PBS 9G and enters a second optical modulation unit 12G. In other words, the second optical modulation unit 12G is an optical modulation unit for the green light.

The green light entering the second optical modulation unit 12G is modulated based on an image signal from the computer and the like connected to the projector. The green light modulated by the second optical modulation unit 12G to be guided to the screen enters the combining prism 35 via the green light PBS 9G. The green light entering the combining prism 35 from the second optical modulation unit 12G is guided to the projection optical system 10P by the combining prism 35.

(Optical Path of Red Light)

The red light from the first dichroic mirror 31a enters a red light PBS 9R via the green light and red light mirror 33, the green light and red light condenser lens 8Y, and the green light and red light dichroic mirror 34. A polarization direction of the red light entering the red light PBS 9R from the light source unit 120 is converted by the above-described polarization conversion unit 5 to a direction reflected by the red light PBS 9R. Thus, the red light entering the red light PBS 9R from the light source unit 120 is reflected by the red light PBS 9R and enters a third optical modulation unit 12R. In other words, the third optical modulation unit 12R is an optical modulation unit for the red light.

The red light entering the third optical modulation unit 12R is modulated based on an image signal from the computer and the like connected to the projector. The red light modulated by the third optical modulation unit 12R to be guided to the screen enters the combining prism 35 via the red light PBS 9R. The red light entering the combining prism 35 from the third optical modulation unit 12R is guided to the projection optical system 10P by the combining prism 35.

(Configuration of Projection Optical System and Holding Unit for Projection Optical System)

The projection optical system 10P is held by a holding unit 10S for the projection optical system. The holding unit 10S may hold the projection optical system 10P removably or unremovably from the holding unit 10S. Further, the holding unit 10S may include a lens shift mechanism for moving the projection optical system 10P to a direction intersecting an optical axis of the projection optical system 10P. The blue light, the green light, and the red light entering the projection optical system 10P from the combining prism 35 are guided to the screen. Accordingly, a color image can be projected on the screen.

Figure 2:
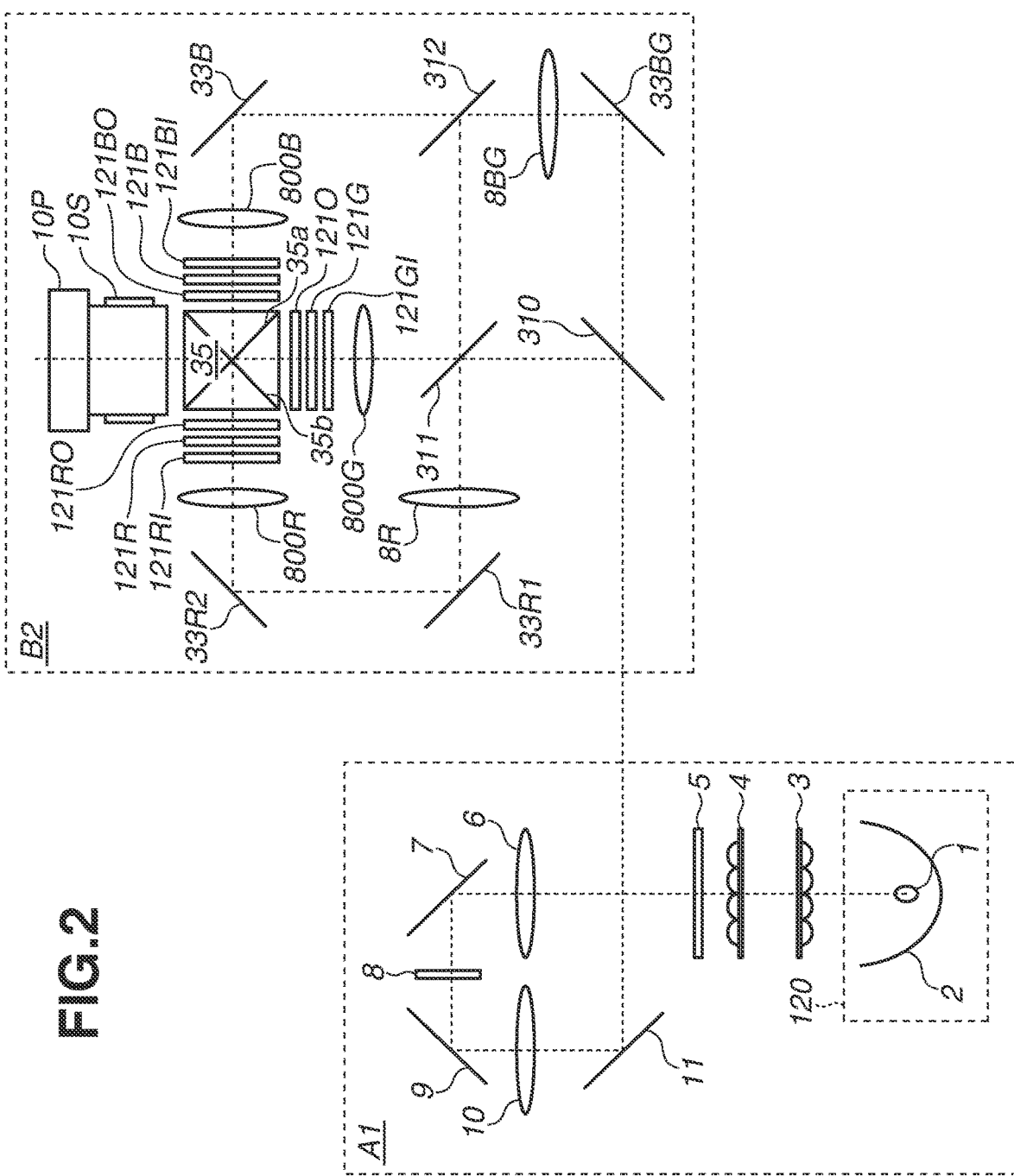
FIG. 2 illustrates a configuration of an image projection apparatus according to a first modification of the first exemplary embodiment.

According to the present exemplary embodiment, the first to the third optical modulation units are reflective liquid crystal panels, however, the first to the third optical modulation units may be transmissive liquid crystal panels as in a first modification of the present exemplary embodiment illustrated in FIG. 2. A configuration A1 illustrated in FIG. 2 is similar to the configuration A1 illustrated in FIG. 1, thus the description thereof is omitted, and a configuration B2 is mainly described.

Light directed from the third mirror 11 to the color separating-combining system first enters a dichroic mirror 310. In other words, a front side color separating unit in the configuration illustrated in FIG. 2 is the dichroic mirror 310. The dichroic mirror 310 has a property of transmitting the blue light and the green light and reflecting the red light.

(Optical Path of Blue Light)

The blue light from the dichroic mirror 310 enters a dichroic mirror 312 via a blue green light mirror 33BG and a blue green light condenser lens 8B. The blue light from the dichroic mirror 312 enters a first optical modulation unit 121B via a blue light mirror 33B, a blue light field lens 800B, and an incident side polarizing plate 121BI. The dichroic mirror 312 has a property of transmitting the blue light and reflecting the green light. A polarization direction of the blue light entering the incident side polarizing plate 121BI from the light source unit 120 is converted by the polarization conversion unit 5 to a direction transmitting the incident side polarizing plate 121BI. Thus, the blue light entering the incident side polarizing plate 121BI from the light source unit 120 transmits the incident side polarizing plate 121BI and enters the first optical modulation unit 12B.

The blue light entering the first optical modulation unit 121B is modulated based on an image signal from the computer and the like connected to the projector. The blue light modulated by the first optical modulation unit 121B to be guided to the screen enters the combining prism 35 via an exit side polarizing plate 121BO. The combining prism 35 in FIG. 2 includes the first dichroic film 35a and the second dichroic film 35b similar to the combining prism 35 in FIG. 1, however, arrangement of the two dichroic films is reversed in FIGS. 1 and 2. The blue light entering the combining prism 35 from the first optical modulation unit 121B is guided to the projection optical system 10P by the combining prism 35.

(Optical Path of Green Light)

The green light from the dichroic mirror 310 enters the dichroic mirror 312 via the blue green light mirror 33BG and the blue green light condenser lens 8BG. The green light from the dichroic mirror 312 enters a second optical modulation unit 121G via a dichroic mirror 311, a green light field lens 800G, and an incident side polarizing plate 121GI. The dichroic mirror 311 has a property of reflecting the green light and the red light. The second optical modulation unit 121G is a transmissive liquid crystal panel unit for the green light. A polarization direction of the green light entering the incident side polarizing plate 121GI from the light source unit 120 is converted by the polarization conversion unit 5 to a direction transmitting the incident side polarizing plate 121GI. Thus, the green light entering the incident side polarizing plate 121GI from the light source unit 120 transmits the incident side polarizing plate 121GI and enters the second optical modulation unit 121G.

The green light entering the second optical modulation unit 121G is modulated based on an image signal from the computer and the like connected to the projector. The green light modulated by the second optical modulation unit 121G to be guided to the screen enters the combining prism 35 via an exit side polarizing plate 121GO. The green light entering the combining prism 35 from the second optical modulation unit 121G is guided to the projection optical system 10P by the combining prism 35.

(Optical Path of Red Light)

The red light from the dichroic mirror 310 enters a third optical modulation unit 121R via the dichroic mirror 311, red light mirrors 33R1 and 33R2, a red light field lens 800R, and an incident side polarizing plate 121RI. The third optical modulation unit 121R is a transmissive liquid crystal panel unit for the red light. A polarization direction of the red light entering the incident side polarizing plate 121RI from the light source unit 120 is converted by the polarization conversion unit 5 to a direction transmitting the incident side polarizing plate 121RI. Thus, the red light entering the incident side polarizing plate 121RI from the light source unit 120 transmits the incident side polarizing plate 121RI and enters the third optical modulation unit 121R.

The red light entering the third optical modulation unit 121R is modulated based on an image signal from the computer and the like connected to the projector. The red light modulated by the third optical modulation unit 121R to be guided to the screen enters the combining prism 35 via an exit side polarizing plate 121RO. The red light entering the combining prism 35 from the third optical modulation unit 121R is guided to the projection optical system 10P by the combining prism 35.

A second modification of the present exemplary embodiment is described with reference to FIG. 3. The above-described configuration A1 according to the present exemplary embodiment illustrated in FIG. 1 includes three mirrors in total, however, at least the first mirror 7 and the second mirror 9 may be included as in the second modification illustrated in FIG. 3. In other words, the light source unit, the illumination optical system, and the fourth optical modulation unit may include a plurality of mirrors. More specifically, a mirror may be arranged on an optical path from the light source unit to the fourth optical modulation unit and a mirror may be arranged on an optical path from the fourth optical modulation unit to the front side color separating unit.

Figure 3:
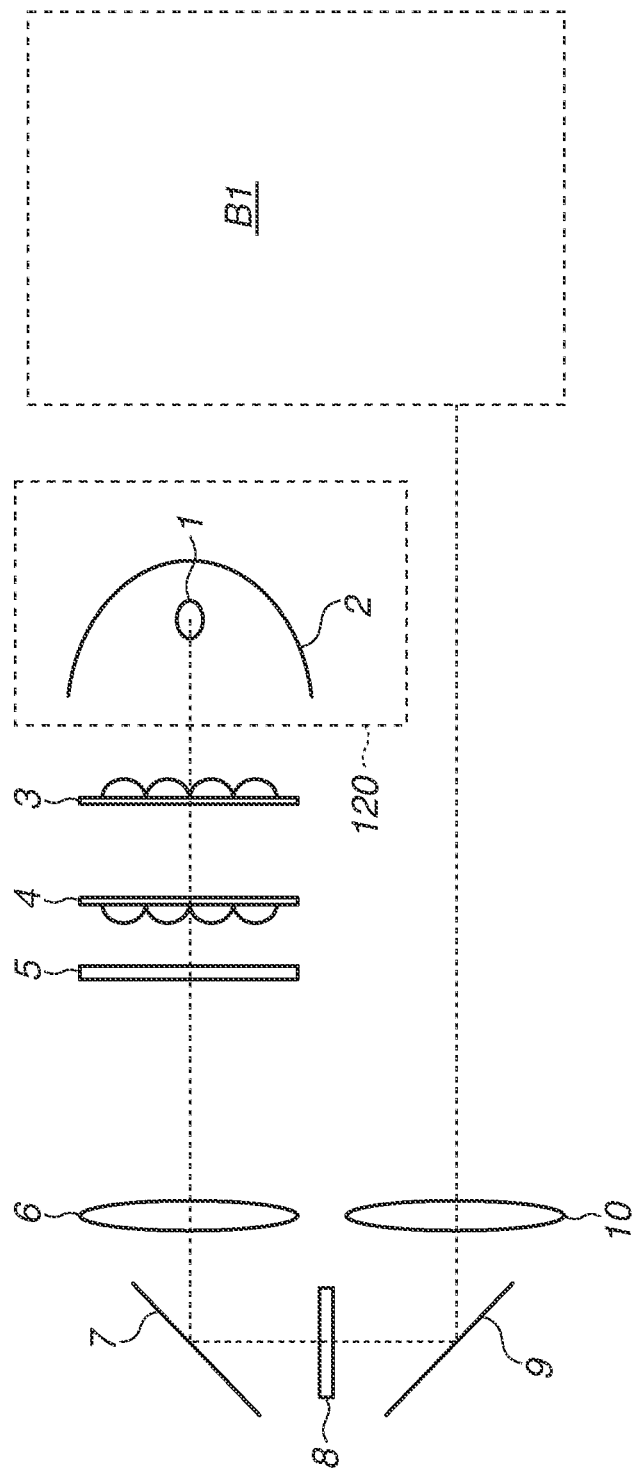
FIG. 3 illustrates a configuration of an image projection apparatus according to a second modification of the first exemplary embodiment.

In FIG. 3, the configuration B1 illustrated in FIG. 1 is adopted as the configuration of the color separating-combining system, the first to the third optical modulation units, and the holding unit for the projection optical system, however, the configuration B2 illustrated in FIG. 2 may be used instead of the configuration B1.

A third modification of the present exemplary embodiment is described with reference to FIG. 4. The above-described configuration A1 according to the present exemplary embodiment illustrated in FIG. 1 includes three mirrors in total, however, the configuration may include a fourth mirror 13 in addition to the first mirror 7, the second mirror 9, and the third mirror 11 as in the third modification illustrated in FIG. 4. The third modification includes mirrors more than the first exemplary embodiment, so that if a space provided in the projector has a distorted shape, the optical system can be easily accommodated in the projector without enlarging the entire projector.

Figure 4:
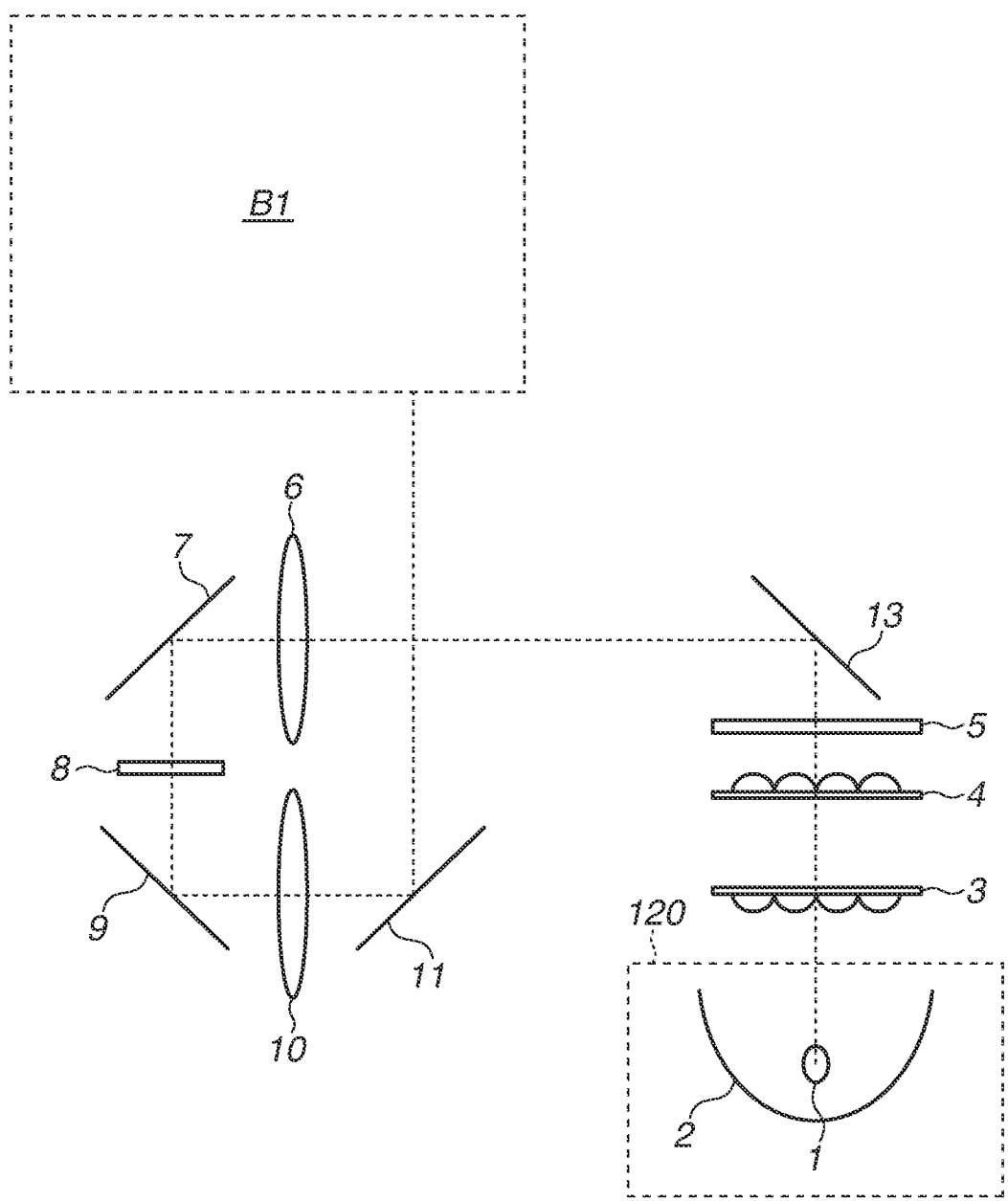
FIG. 4 illustrates a configuration of an image projection apparatus according to a third modification of the first exemplary embodiment.

In FIG. 4, the configuration B1 illustrated in FIG. 1 is adopted as the configuration of the color separating-combining system, the first to the third optical modulation units, and the holding unit for the projection optical system, however, the configuration B2 illustrated in FIG. 2 may be used instead of the configuration B1.

A fourth modification of the present exemplary embodiment is described with reference to FIG. 5. The above-described configuration A1 according to the present exemplary embodiment illustrated in FIG. 1 includes three mirrors in total, however, the configuration may include the fourth mirror 13 and a fifth mirror 14 in addition to the first mirror 7, the second mirror 9, and the third mirror 11 as in the fourth modification illustrated in FIG. 5. The fourth modification includes mirrors more than the third modification, so that if a space provided in the projector has a distorted shape, the optical system can be easily accommodated in the projector without enlarging the entire projector.

In FIG. 5, the configuration B1 illustrated in FIG. 1 is adopted as the configuration of the color separating-combining system, the first to the third optical modulation units, and the holding unit for the projection optical system, however, the configuration B2 illustrated in FIG. 2 may be used instead of the configuration B1.

Figure 6A:
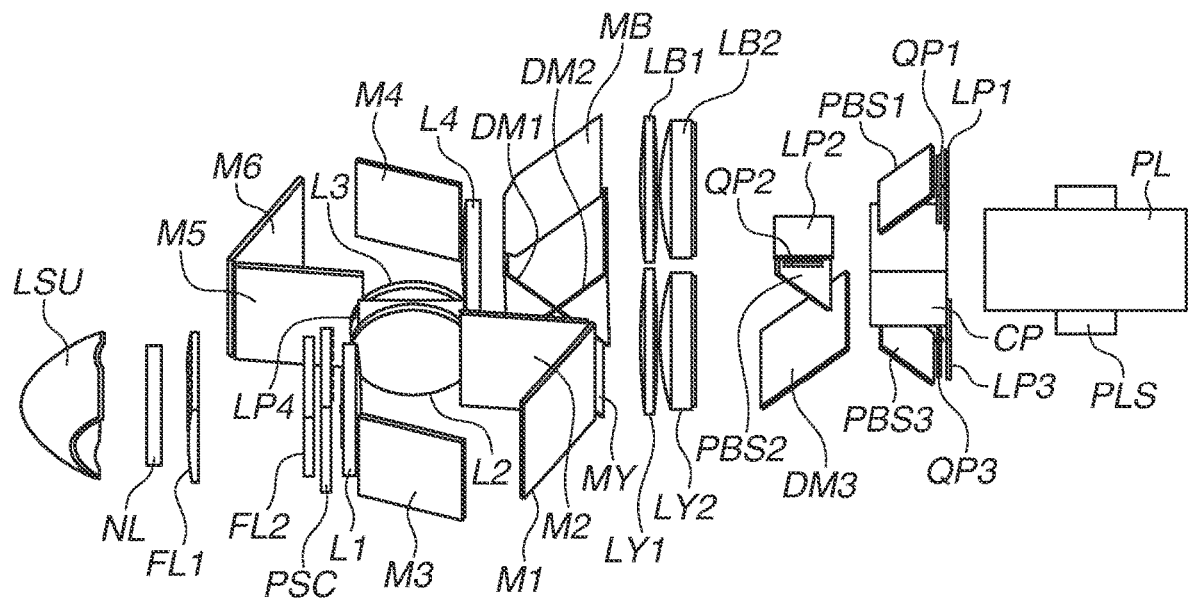
FIGS. 6A and 6B illustrate a configuration of an image projection apparatus according to a second exemplary embodiment.
Figure 6B:
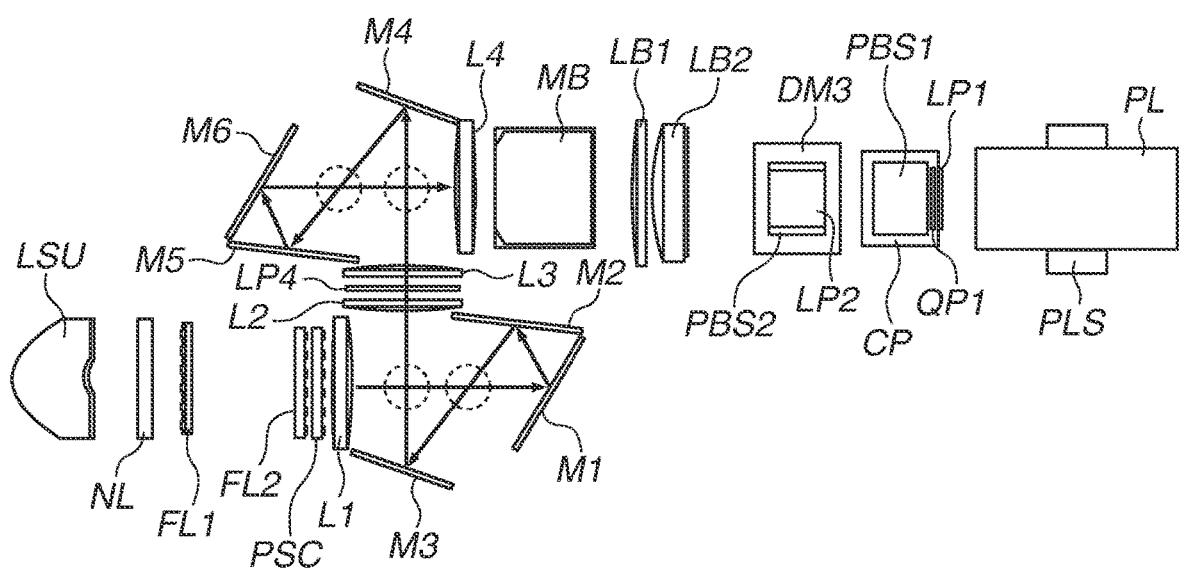

A configuration of an image projection apparatus according to a second exemplary embodiment is described with reference to FIGS. 6A and 6B. FIG. 6A is a perspective view of an optical system installed in the image projection apparatus according to the present exemplary embodiment, and FIG. 6B is a plan view of the optical system. More specifically, FIG. 6B is a plan view of the optical system installed in the image projection apparatus according to the present exemplary embodiment viewed from a normal direction of a plane parallel to a normal line (passing through the center) of a first mirror M1 and an incident direction of incident light to the first mirror M1. The same applies to FIGS. 7B and 8B described below.

The image projection apparatus according to the present exemplary embodiment includes a configuration provided with six mirrors in total on an optical path from a light source unit LSU to dichroic mirrors DM1 and DM2 as a front side color separating unit. The configuration is described below.

(Configuration from Light Source Unit to Front Side Color Separating Unit)

In FIGS. 6A and 6B, the light source unit LSU includes an elliptical reflector and a light emission tube. A negative lens NL converts converged light from the light source unit LSU to collimated light. An illuminance distribution of the light from the negative lens NL is equalized by a first fly-eye lens FL1 and a second fly-eye lens FL2, and a polarization direction thereof is arranged in a predetermined polarization direction by a polarization conversion unit PSC.

The light from the polarization conversion unit PSC enters the first mirror M1 via a lens L1. An optical path on a plane illustrated in FIG. 6B is described. The light from the first mirror M1 is raised in an upward direction of a sheet of FIG. 6B and enters a second mirror M2. The light from the second mirror M2 is guided to a downward direction of the sheet and enters a third mirror M3. The light from the third mirror M3 is guided to the upward direction of the sheet and enters a fourth optical modulation unit LP4 via a lens L2. The fourth optical modulation unit LP4 is a transmissive liquid crystal panel unit.

The light from the fourth optical modulation unit LP4 enters a fourth mirror M4 via a lens L3. The light from the fourth mirror M4 is guided to the downward direction of the sheet, guided to the upward direction of the sheet by a fifth mirror M5, and enters a sixth mirror M6. The light from the sixth mirror M6 enters the dichroic mirrors DM1 and DM2 as the front side color separating unit via a lens L4.

According to the present exemplary embodiment, arrangement of the first mirror M1 to the sixth mirror M6 is devised as illustrated in FIGS. 6A and 6B so as to reduce a space for arranging each optical component arranged on an optical path from the light source unit LSU to the dichroic mirrors DM1 and DM2. According to the present exemplary embodiment and third and fourth exemplary embodiments described below, the first mirror M1 to the sixth mirror M6 correspond to a reflection unit.

Specifically, as shown by a plurality of arrows and dashed line circles in FIG. 6B, each mirror is arranged so that an optical path crosses the optical path itself at least once in the optical path from the light source unit LSU to the dichroic mirrors DM1 and DM2. Positions indicated by the dashed line circles in FIG. 6B are positions at which the optical paths cross each other. The arrangement can reduce the space for arranging each optical component arranged on the optical path from the light source unit LSU to the dichroic mirrors DM1 and DM2 while entering the light from the light source unit LSU to the fourth optical modulation unit LP4.

According to the present exemplary embodiment, the number of times that the optical path crosses itself is four times in total, namely the optical path crosses itself twice on the light source unit LSU side than the fourth optical modulation unit LP4 and twice on the dichroic mirrors DM1 and DM2 side. In other words, each mirror is arranged so as to make a point exist at which the optical path crosses itself on the optical path from the light source unit to the front side color separating unit. More specifically, each mirror is arranged so that the optical path crosses itself at four points on the optical path from the light source unit to the front side color separating unit. Further, the optical path crosses itself at two points on the optical path from the light source unit to the fourth optical modulation unit. At the same time, the optical path crosses itself at two points on the optical path from the fourth optical modulation unit to the front side color separating unit.

In addition, the first mirror M1, the second mirror M2, and the third mirror M3 are arranged on the optical path from the light source unit LSU to the fourth optical modulation unit LP4. Further, the fourth mirror M4, the fifth mirror M5, and the sixth mirror M6 are arranged on the optical path from the fourth optical modulation unit LP4 to the dichroic mirrors DM1 and DM2. Each mirror is arranged so that the first mirror M1 and the sixth mirror M6 are parallel to each other, the second mirror M2 and the fifth mirror M5 are parallel to each other, and the third mirror M3 and the fourth mirror M4 are parallel to each other. In other words, the respective mirrors are arranged symmetrically with the fourth optical modulation unit LP4 as a symmetric plane. The arrangement can provide an effect of facilitating an optical design.

(Configuration after Front Side Color Separating Unit)

The dichroic mirror DM1 has a property of transmitting the blue light and reflecting the green light and the red light, and the dichroic mirror DM2 has a property of reflecting the blue light and transmitting the green light and the red light.

(Optical Path of Blue Light)

The blue light transmitting the dichroic mirror DM1 and reflected by the dichroic mirror DM2 enters a first polarization separation unit PBS1 via condenser lenses LB1 and LB2. A polarization direction of the blue light entering the first polarization separation unit PBS1 is directed to a polarization direction transmitting the first polarization separation unit PBS1 by the polarization conversion unit PSC. Thus, the blue light entering the first polarization separation unit PBS1 transmits the first polarization separation unit PBS1 and enters a first optical modulation unit LP1 via a first λ/4 plate QP1.

The first λ/4 plate QP1 is used for suppressing lowering of contrast caused by light obliquely entering the first polarization separation unit PBS1, however, the first λ/4 plate QP1 may not be included. The same applies to second and third λ/4 plates described below. In addition, the first polarization separation unit PBS1 may be a wire grid type polarization separation unit or other polarization separation units. The first optical modulation unit LP1 is a reflective liquid crystal panel unit. The same applies to second and third polarization separation units described below.

The blue light entering the first optical modulation unit LP1 is modulated based on an image signal from the computer and the like connected to the projector. The blue light modulated by the first optical modulation unit LP1 to be guided to the screen enters a combining prism CP via the first λ/4 plate QP1 and the first polarization separation unit PBS1 and is guided to a projection lens PL held by a holding unit PLS. A configuration of the holding unit PLS is similar to that of the holding unit 10S according to the above-described first exemplary embodiment. The combining prism CP includes a plurality of the dichroic films for guiding the entering blue light, green light, and red light to the projection lens PL as with the above-described combining prism 35.

(Optical Path of Green Light)

The green light and the red light reflected by the dichroic mirror DM1 and transmitting the dichroic mirror DM2 enter a dichroic mirror DM3 via condenser lenses LY1 and LY2. The dichroic mirror DM3 has a property of reflecting the green light and transmitting the red light.

The green light reflected by the dichroic mirror DM3 is guided to the projection lens PL via a second polarization separation unit PBS2, a second λ/4 plate QP2, a second optical modulation unit LP2, and the combining prism CP as with the above-described blue light.

(Optical Path of Red Light)

The red light transmitting the dichroic mirror DM3 is guided to the projection lens PL via a third polarization separation unit PBS3, a third λ/4 plate QP3, a third optical modulation unit LP3, and the combining prism CP as with the above-described blue light and green light.

Figure 7A:
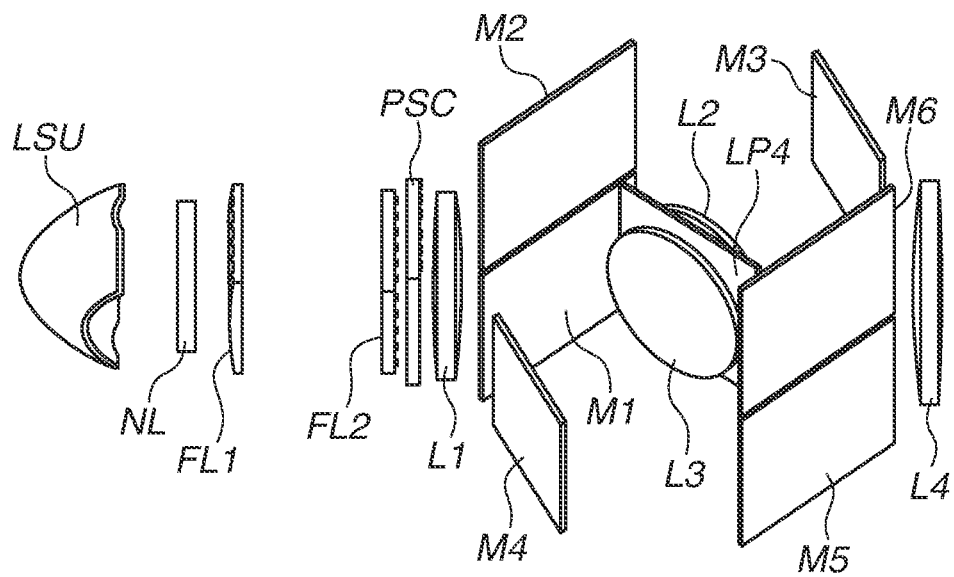
FIGS. 7A and 7B illustrate a configuration of an image projection apparatus according to a third exemplary embodiment.

A configuration of an image projection apparatus according to a third exemplary embodiment is described with reference to FIGS. 7A and 7B. The present exemplary embodiment is different from the above-described second exemplary embodiment in arrangement of each mirror from the first mirror M1 to the sixth mirror M6. The configuration other than that and effects obtained by the configuration described according to the present exemplary embodiment are similar to those of the above-described second exemplary embodiment, so that the description thereof is partly omitted.

Figure 7B:
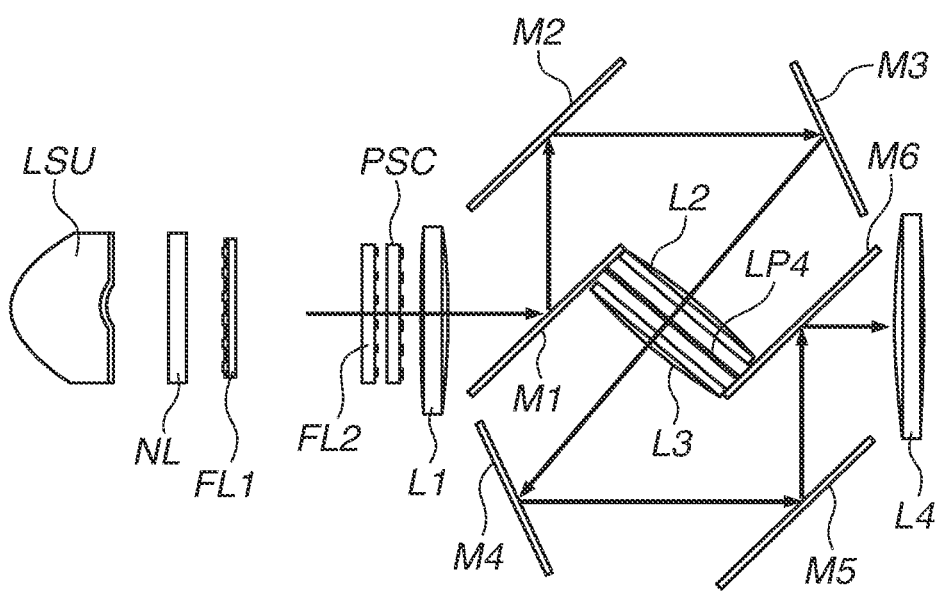

Arrangement of each mirror according to the present exemplary embodiment is described based on an optical path on a plane illustrated in FIG. 7B. Light from the lens L1 enters the first mirror M1, is guided to the upward direction of the sheet of FIG. 7B, and enters the second mirror M2. The light from the second mirror M2 is guided to a right direction of the sheet and enters the third mirror M3.

The light from the third mirror M3 is directed to the fourth mirror M4 on a position symmetrical to the third mirror M3 with the fourth optical modulation unit LP4 as a symmetry plane. The light from the fourth mirror M4 is directed to the right direction of the sheet, guided to the upward direction of the sheet by the fifth mirror M5, finally reflected by the sixth mirror M6, and enters the lens L4.

According to the above-described second exemplary embodiment, there are four points at which an optical path from the first mirror M1 to the sixth mirror M6 crosses the optical path itself. In contrast, according to the present exemplary embodiment, there is no crossing point of the optical path as illustrated in FIG. 7B. Even in this configuration, an effect of miniaturization can be obtained as with the above-described second exemplary embodiment.

The configuration of each mirror (a reflection unit) according to the present exemplary embodiment can be paraphrased as follows. Specifically, a direction that the light from the light source unit enters the first mirror is referred to as an incident direction. In this instance, respective mirrors are arranged so that a line segment connecting a center of a predetermined mirror in the respective mirrors and a center of a mirror to which the light from the predetermined mirror enters via the fourth optical modulation unit crosses the incident direction.

More specifically, a line segment connecting the center of the first mirror and the center of the second mirror does not cross the incident direction, and a line segment connecting the center of the second mirror and the center of the third mirror does not cross the incident direction. Further, a line segment connecting the center of the third mirror and the center of the fourth mirror crosses the incident direction, and a line segment connecting the center of the fourth mirror and the center of the fifth mirror does not cross the incident direction. Furthermore, a line segment connecting the center of the fifth mirror and the center of the sixth mirror does not cross the incident direction.

A configuration of an image projection apparatus according to a fourth exemplary embodiment is described with reference to FIGS. 8A and 8B. The present exemplary embodiment is different from the above-described second and third exemplary embodiments in arrangement of each mirror from the first mirror M1 to the sixth mirror M6. The configuration other than that and effects obtained by the configuration described according to the present exemplary embodiment are similar to those of the above-described second and third exemplary embodiments, so that the description thereof is partly omitted.

Figure 8A:
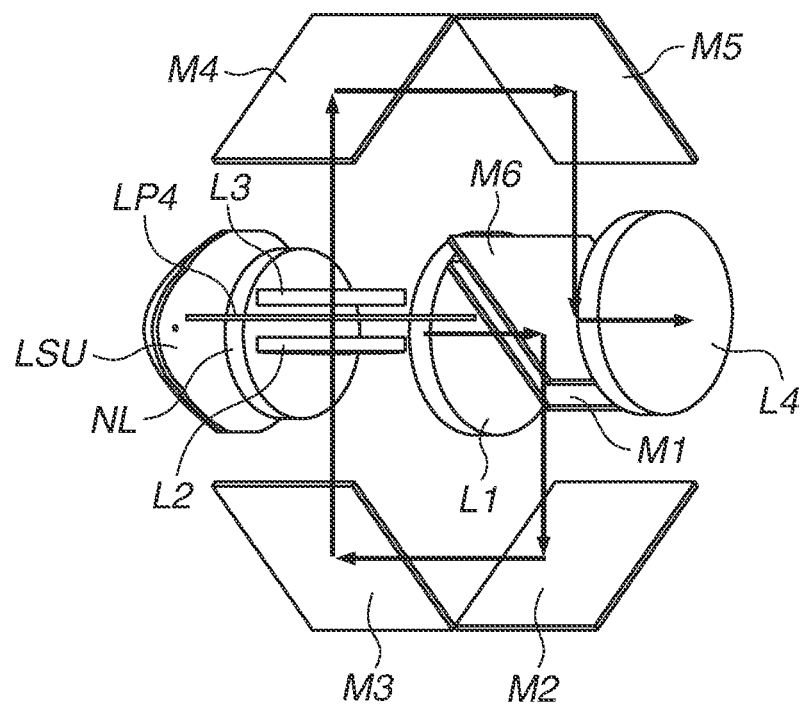
FIGS. 8A and 8B illustrate a configuration of an image projection apparatus according to a fourth exemplary embodiment.
Figure 8B:
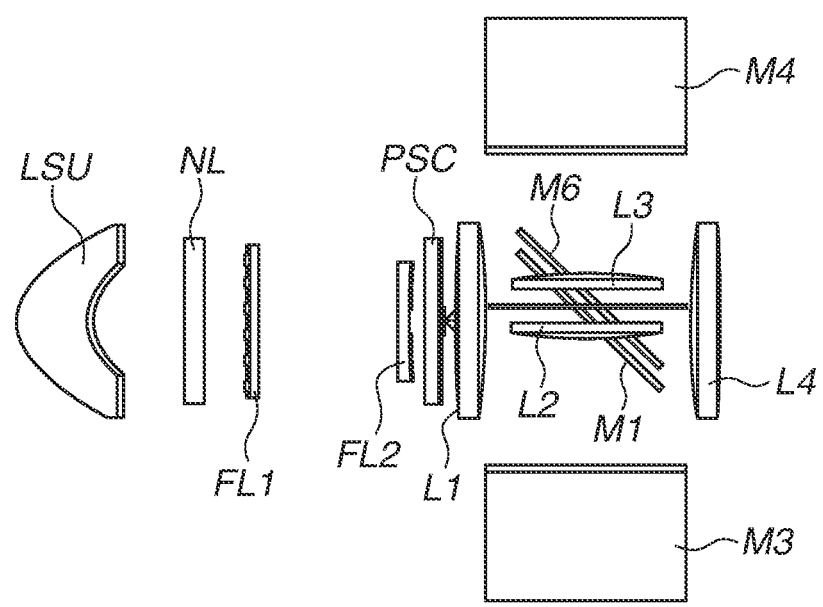

Arrangement of each mirror according to the present exemplary embodiment is described based on FIGS. 8A and 8B. According to the present exemplary embodiment, the mirrors excepting the first mirror M1 and the sixth mirror M6 are arranged circularly. Specifically, light entering the first mirror M1 from the lens L1 is guided to the downward direction of the sheet of FIG. 8B by the first mirror M1 and enters the second mirror M2.

The light from the second mirror M2 is guided to a front direction of the sheet of FIG. 8B, guided to the upward direction of the sheet by the third mirror M3, and enters the fourth mirror M4 via the lens L2, the fourth optical modulation unit LP4, and the lens L3. The light from the fourth mirror M4 is guided to a depth direction of the sheet of FIG. 8B, guided to the downward direction of the sheet by the fifth mirror M5, and enters the sixth mirror M6.

As described above, according to the present exemplary embodiment, each mirror is arranged so as to pass a predetermined plane orthogonal to an incident direction of the light from the light source unit LSU to the first mirror M1 (the right direction of the sheet of FIG. 8B). Thus, according to the present exemplary embodiment, a dimension in the right to left direction of the sheet of FIG. 8B of a space for arranging each mirror can be further reduced as compared with the cases of the above-described second and third exemplary embodiments.

The arrangement of each mirror according to the present exemplary embodiment can be said arrangement in which the first mirror M1 and the second mirror M2 are in a twisted relationship, and the fifth mirror M5 and the sixth mirror M6 are in a twisted relationship.

A configuration of an image projection apparatus according to a fifth exemplary embodiment is described with reference to FIG. 9. According to the above-described first to fourth exemplary embodiments, the fourth optical modulation unit is the transmissive liquid crystal panel unit, however, according to the present exemplary embodiment, the fourth optical modulation unit is a reflective liquid crystal panel unit.

Figure 9:
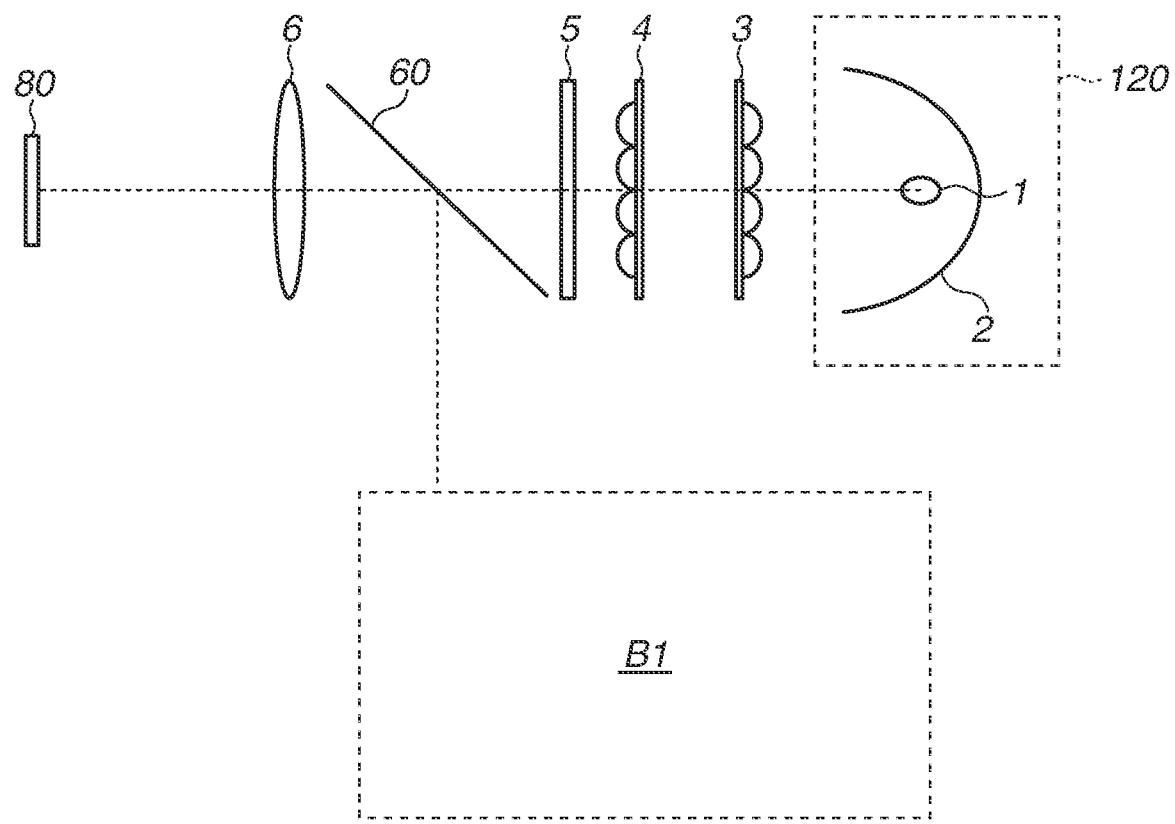
FIG. 9 illustrates a configuration of an image projection apparatus according to a fifth exemplary embodiment.

FIG. 9 illustrates the configuration of the image projection apparatus according to the present exemplary embodiment. The configuration from the light source unit 120 to the polarization conversion unit 5 is similar to that according to the above-described first exemplary embodiment. According to the present exemplary embodiment, the light from the polarization conversion unit 5 transmits a polarization separation unit 60 and enters a fourth optical modulation unit 80 via a condenser lens 6. The fourth optical modulation unit 80 is a reflective liquid crystal panel unit, so that the light modulated by the fourth optical modulation unit 80 to be reflected by the polarization separation unit 60 enters the polarization separation unit 60 via the condenser lens 6. The light reflected by the polarization separation unit 60 enters the cross dichroic mirror 31. As with each modification in the above-described first exemplary embodiment, the configuration B2 can be used instead of the configuration B1.

According to the present exemplary embodiment including the above-described configuration, an optical path from the light source unit to the front side color separating unit via the fourth optical modulation unit partly overlaps with itself. Thus, a space for arranging each optical component arranged on the optical path from the light source unit to the front side color separating unit via the fourth optical modulation unit can be reduced than that of a conventional technique. The point that the higher contrast can be realized by including the fourth optical modulation unit is similar to the above-described first exemplary embodiment.

Figure 10:
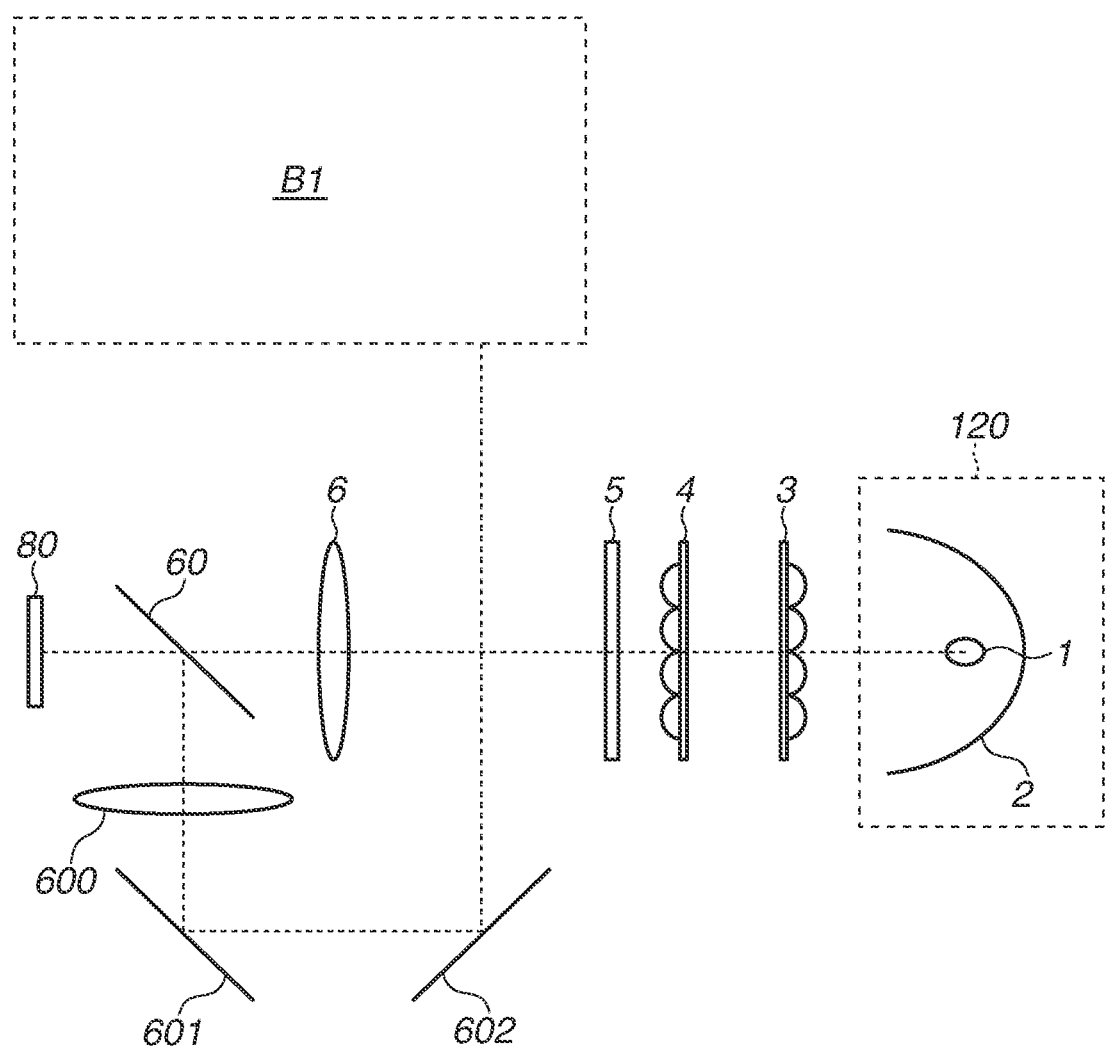
FIG. 10 illustrates a configuration of an image projection apparatus according to a first modification of the fifth exemplary embodiment.

A first modification of the present exemplary embodiment is described with reference to FIG. 10. A configuration illustrated in FIG. 10 is different from the configuration illustrated in FIG. 9 in that the number of reflection times of the optical path is increased by adding mirrors 601 and 602, and accordingly a condenser lens 600 is added. The configuration can accommodate each optical component without enlarging the entire projector even if a space for arranging each optical component arranged on the optical path from the light source unit to the front side color separating unit has a distorted shape.

A second modification of the present exemplary embodiment is described with reference to FIG. 11. A configuration illustrated in FIG. 11 is similar to that in FIG. 9 in that the fourth optical modulation unit is a reflective liquid crystal panel, however, a configuration on an optical path after the polarization separation unit 60 is mainly different.

Figure 11:
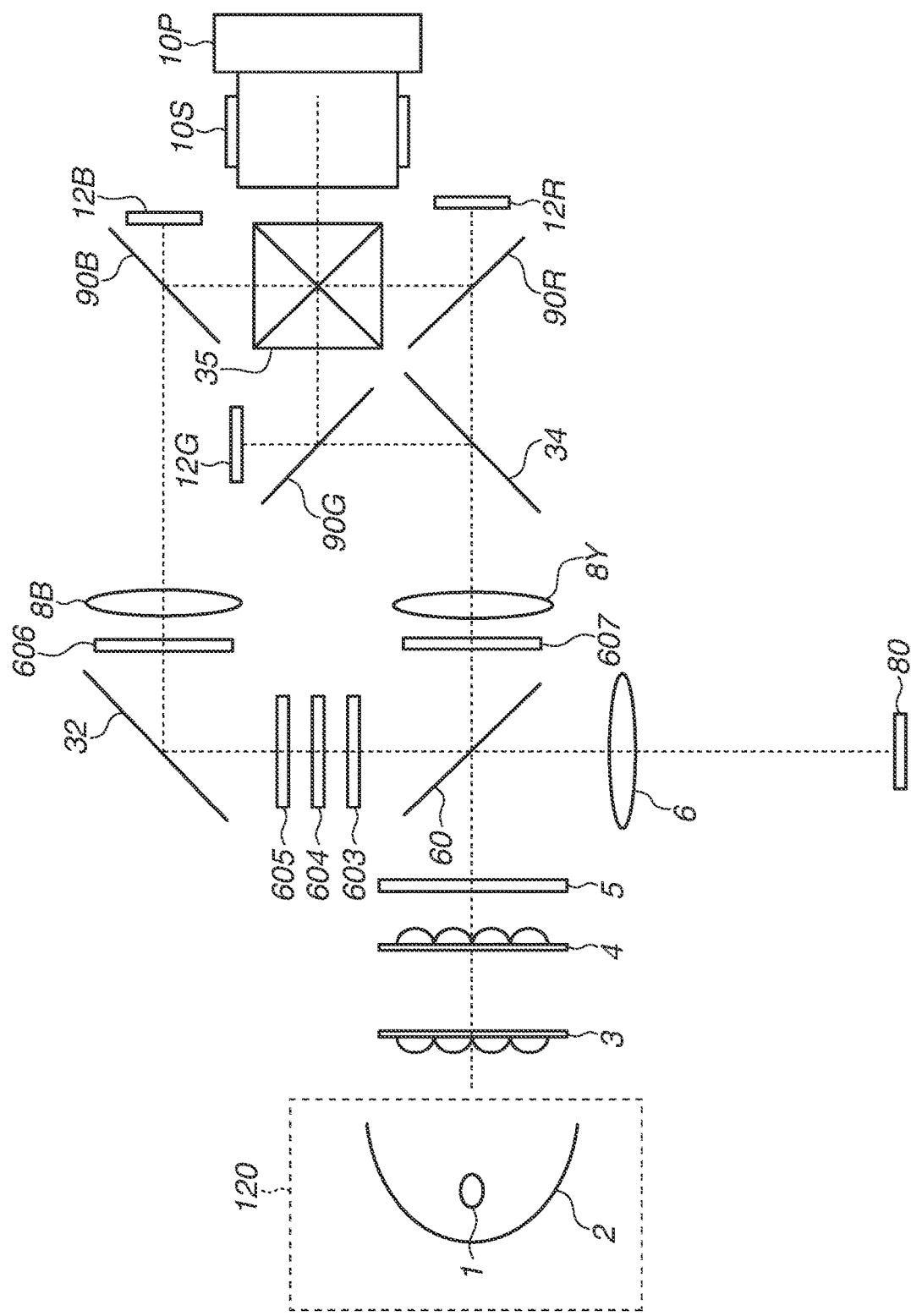
FIG. 11 illustrates a configuration of an image projection apparatus according to a second modification of the fifth exemplary embodiment.

In FIG. 11, p-polarized light transmitting the polarization separation unit 60 is converted to circularly polarized light by entering an incident side $\lambda/4$ plate 603 and then enters a dichroic mirror 604. The dichroic mirror 604 has a property of transmitting the blue light and reflecting the green light and the red light.

The blue light transmitting the dichroic mirror 604 is converted to s-polarized light by transmitting an exit side $\lambda/4$ plate 605 and is converted to p-polarized light by transmitting a 212 plate 606 via the blue light mirror 32. Then, the light enters the first optical modulation unit 12B via the blue light condenser lens 8B and a blue light PBS 90B. The blue light PBS 9B according to the above-described first exemplary embodiment is a prism type PBS including a dielectric multilayer film between two prisms, however, the blue light PBS 90B according to the present modification is a wire grid type PBS. The same applies to a green light PBS 90G and a red light PBS 90R described below. The subsequent optical path is similar to that according to the above-described first exemplary embodiment, and thus the description thereof is omitted.

The green light and the red light reflected by the dichroic mirror 604 transmit the incident side $\lambda/4$ plate 603 again and thus are converted from the circularly polarized light to s-polarized light. The green light and the red light are further reflected by the polarization separation unit 60 and converted to p-polarized light by transmitting a $\lambda/2$ plate 607. The subsequent optical path is similar to that according to the above-described first exemplary embodiment, and thus the description thereof is omitted.

Figure 12:
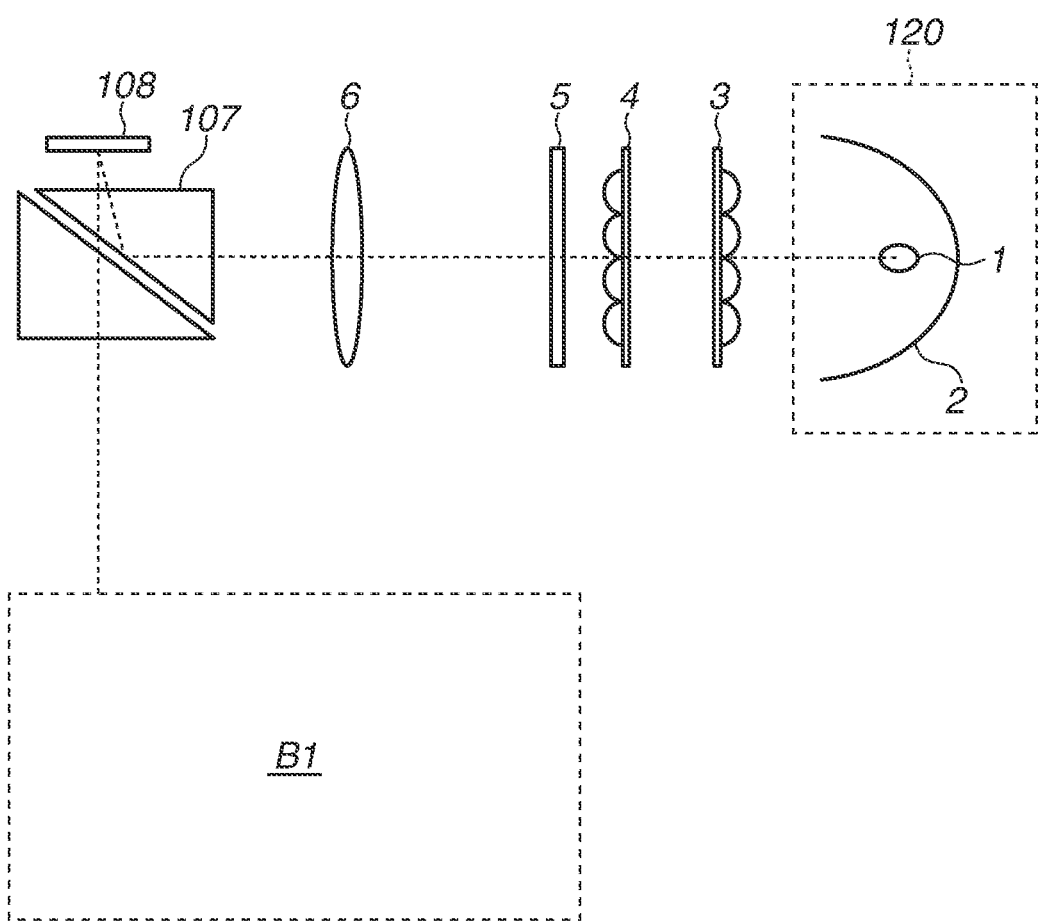
FIG. 12 illustrates a configuration of an image projection apparatus according to a sixth exemplary embodiment.

A configuration of an image projection apparatus according to a sixth exemplary embodiment is described with reference to FIG. 12. The fourth optical modulation unit is the transmissive liquid crystal panel unit according to the first to the fourth exemplary embodiments and is the reflective liquid crystal panel unit according to the fifth exemplary embodiment, however, is a micro mirror array according to the present exemplary embodiment. The configuration other than that is similar to at least a part of the above-described first to fifth exemplary embodiments, so that the description thereof is partly omitted.

Light from the condenser lens 6 enters a micro mirror array 106 via a total reflection prism 107. The total reflection prism 107 has a property of reflecting light at an incident angle satisfying a total reflection condition and transmitting other light. Thus, the light from the condenser lens 6 enters the micro mirror array 106 by being reflected by the total reflection prism 107, and the light of which an angle is modulated by the micro mirror array 106 transmits the total reflection prism 107 and is guided to the above-described configuration B1 or configuration B2.

In the configuration in which the fourth optical modulation unit is a micro mirror array like the present exemplary embodiment, the optical path from the light source unit to the front side color separating unit partly overlaps with itself as with the above-described fifth exemplary embodiment, and thus the effect of miniaturization can be obtained as with the above-described fifth exemplary embodiment. In addition, the effect of realizing high contrast can be obtained as with the above-described respective exemplary embodiments.

Figure 13:
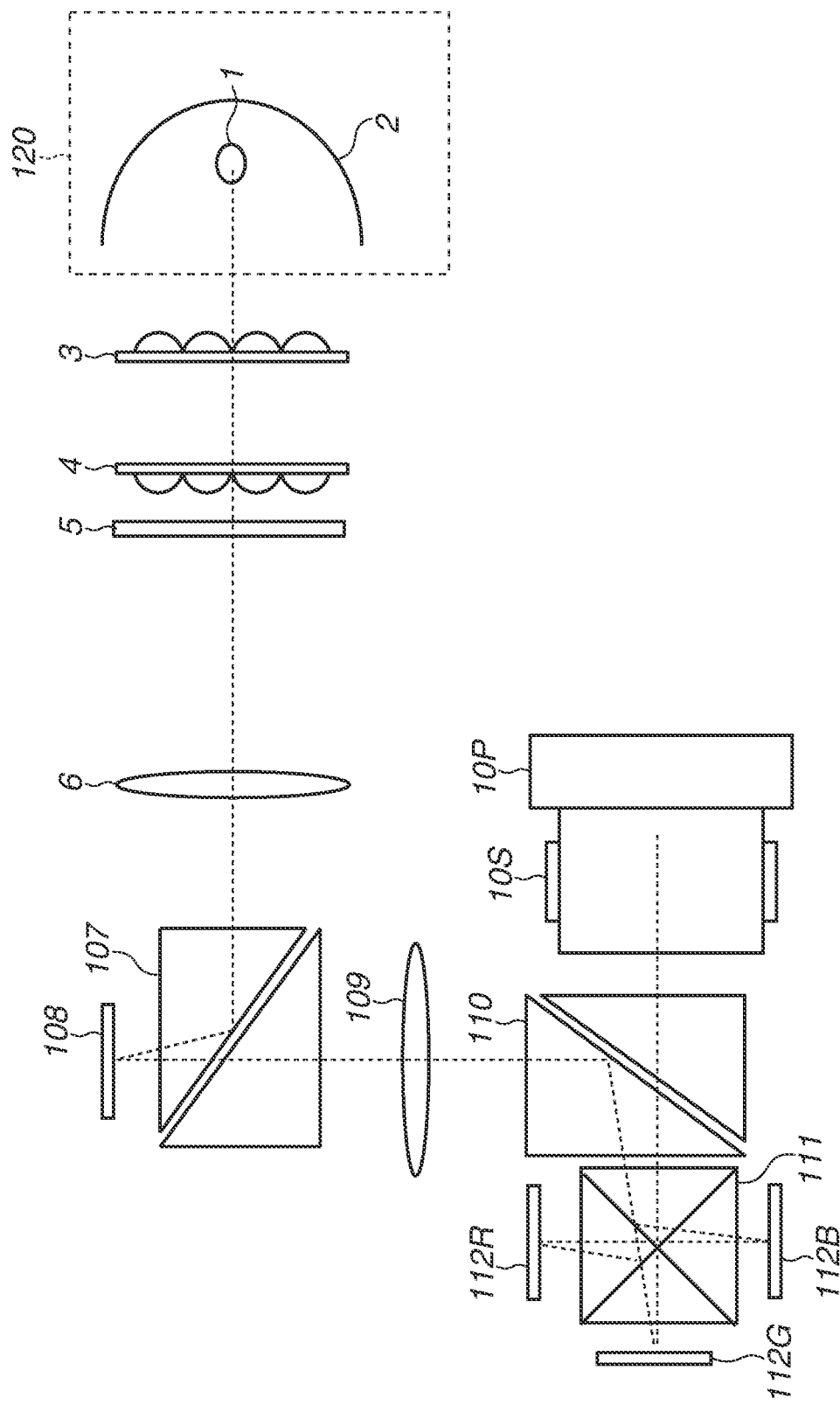
FIG. 13 illustrates a configuration of an image projection apparatus according to a modification of the sixth exemplary embodiment.

A modification of the present exemplary embodiment is described with reference to FIG. 13. In the above-described configuration illustrated in FIG. 12, the light from the total reflection prism 107 enters the reflective liquid crystal panel units of the respective color lights included in the configuration B1 or B2. In contrast, in a configuration illustrated in FIG. 13, the first to the third optical modulation units are micro mirror arrays.

The light from the total reflection prism 107 enters a total reflection prism 110 via a condenser lens 109. The light from the condenser lens 109 is reflected by the total reflection prism 110 and enters a cross dichroic prism 111. The cross dichroic prism 111 is configured to respectively guide the blue light, the green light, and the red light in the light from the total reflection prism 110 to a first optical modulation unit 112B, a second optical modulation unit 112G, and a third optical modulation unit 112R. As described above, each optical modulation unit is the micro mirror array. The respective color lights of which angles are modulated by the respective optical modulation units transmit the total reflection prism 110 and are guided to the screen via a projection lens 10P. As described above, according to the present exemplary embodiment, the first to the third optical modulation units are not limited to the reflective liquid crystal panel unit.

Next, more desirable embodiments common to the above-described exemplary embodiments or to a part of the exemplary embodiments are described.

A focal length of a first condenser lens unit, a focal length of a second condenser lens unit, a diagonal line length of an effective area of the fourth optical modulation unit, and a diagonal line length of an effective area of the first optical modulation unit are respectively defined as F1, F2, P1, and P2. In this instance, it is desirable that the image projection apparatus satisfies a following relationship (1):

$$0.7 \leq (F1*P2)/(F2*P1) \leq 1.3 \tag{1}.$$

Satisfying the relationship (1) means that a ratio of F1 to F2 is approximately equal to a ratio of P1 to P2. When a value deviates from a lower limit value of the above-described relationship (1), it is not desirable because a light flux of the illumination light illuminating the first optical modulation unit becomes too large, and a loss of light quantity in the first optical modulation unit is increased. In contrast, when the value deviates from an upper limit value, it is not desirable because a light flux of the illumination light illuminating the fourth optical modulation unit becomes too large, and a loss of light quantity in the fourth optical modulation unit is increased.

It is further desirable that the image projection apparatus satisfies a following relationship (1A) or (1B):

$$0.8 \leq (F1*P2)/(F2*P1) \leq 1.2 \tag{1A}$$

$$0.9 \leq (F1*P2)/(F2*P1) \leq 1.1 \tag{1B}.$$

In addition, when an air conversion length from a principal plane of the first condenser lens unit to a principal plane of the second condenser lens unit is defined as D12, it is desirable that the image projection apparatus satisfies a following relationship (2):

$$0.7 \leq D12/(F1+F2) \leq 1.3 \tag{2}.$$

When a value deviates from a lower limit value or an upper limit value of the above-described relationship (2), telecentricity of a relay lens system constituted of the first condenser lens unit and the second condenser lens unit (a lens system for reforming an image of the fourth optical modulation unit on the first optical modulation unit) is deteriorated. Accordingly, it is not desirable because resolution of the image projection apparatus is deteriorated.

It is further desirable that the image projection apparatus satisfies a following relationship (2A) or (2B):

$$0.85 \leq D12/(F1+F2) \leq 1.15 \tag{2A}$$

$$0.9 \leq D12/(F1+F2) \leq 1.1 \tag{2B}.$$

Further, a width of a first light source image area (a first area) namely an area crossing the optical path from the light source unit to the fourth optical modulation unit and in which a first light source image is formed is defined as D1. Furthermore, a width of a second light source image area (a second area) namely an area crossing the optical path from the fourth optical modulation unit to the front side color separating unit and in which a second light source image is formed is defined as D2. In this instance, it is desirable that the image projection apparatus satisfies a following relationship (3):

$$0.7 \leq D1/D2 \leq 1.3 \tag{3}.$$

It is further desirable that the image projection apparatus satisfies a following relationship (3A) or (3B):

$$0.8 \leq D1/D2 \leq 1.2 \tag{3A}$$

$$0.9 \leq D1/D2 \leq 1.1 \tag{3B}.$$

When a focusing magnification of a relay lens unit is defined as X, it is desirable that the image projection apparatus satisfies a following relationship (4):

$$0.7 \leq X \leq 1.3 \tag{4}.$$

It is further desirable that the image projection apparatus satisfies a following relationship (4A) or (4B):

$$0.8 \leq X \leq 1.2 \tag{4A}$$

$$0.9 \leq X \leq 1.1 \tag{4B}.$$

Further, when a focal length of a first relay lens unit and a focal length of a second relay lens unit are respectively defined as FR1 and FR2, it is desirable that the image projection apparatus satisfies a following relationship (5):

$$0.7 \leq FR1/FR2 \leq 1.3 \tag{5}.$$

It is further desirable that the image projection apparatus satisfies a following relationship (5A) or (5B):

$$0.8 \leq FR1/FR2 \leq 1.2 \tag{5A}$$

$$0.9 \leq FR1/FR2 \leq 1.1 \tag{5B}.$$

The fact that the image projection apparatus satisfies at least one of the relationships (3), (4), and (5) means that the width D1 of the first light source image area and the width D2 of the second light source image area described above are approximately equal to each other. The first light source image area is formed by the second fly-eye lens so as to be located on a position near the polarization conversion unit or a position overlapping with the polarization conversion unit. The second light source image area is formed by a lens unit having positive power arranged on the optical path after the fourth optical modulation unit so as to be located somewhere on the optical path from the fourth optical modulation unit to the front side color separating unit.

In the image projection apparatus not including the fourth optical modulation unit, sizes of optical components after the first light source image area are determined according to a value of the width D1 of the first light source image area. Therefore, a value of the width D2 of the second light source image area is made approximately equal to the value of the width D1 of the first light source image area, and accordingly, the optical components in the first light source image area and subsequent areas adopted by the image projection apparatus not including the fourth optical modulation unit can be utilized as they are in the image projection apparatus including the fourth optical modulation unit. Alternatively, a significant design change is not necessary.

The above-described first condenser lens unit refers to a single positive lens or a plurality of lenses having positive power as a whole arranged on the optical path from the above-described first light source image area to the fourth optical modulation unit. Similarly, the above-described second condenser lens unit refers to a single positive lens or a plurality of lenses having positive power as a whole arranged on the optical path from the above-described second light source image area to the first optical modulation unit. For example, in FIG. 1, the lens 6 corresponds to the first condenser lens unit, and the lens 8B or the lens 8Y corresponds to the second condenser lens unit.

The field lens for each color light in the configuration B2 illustrated in FIG. 2 may be included or not included in the second condenser lens unit.

The above-described first relay lens unit and second relay lens unit can be defined as follows. A plurality of lenses for forming the light from the above-described first light source image as a second light source image, in other words, a plurality of lenses existing between the above-described first light source image formation area and a second light source image formation area is referred to as a relay lens unit. Further, in the relay lens unit, a single positive lens or a plurality of lenses having positive power as a whole existing on the first light source image formation area side than the fourth optical modulation unit is defined as the first relay lens unit. Similarly, in the relay lens unit, a single positive lens or a plurality of lenses having positive power as a whole existing on the second light source image formation area side than the fourth optical modulation unit is defined as the second relay lens unit. For example, in FIG. 1, the lens 6 corresponds to the first relay lens unit, and the lens 10 corresponds to the second relay lens unit. In FIG. 1, the first light source image formation area is located near the polarization conversion unit 5, and the second light source image formation area is located on the optical path from the lens 10 to the cross dichroic mirror 31.

Further, when an air conversion length from a principal plane of the second relay lens unit to the principal plane of the second condenser lens unit is defined as DR2, it is desirable that the image projection apparatus satisfies a following relationship (6).

$$0.7 \leq DR2/(FR2+F2) \leq 1.3 \quad (6)$$

When a value deviates from a lower limit value or an upper limit value of the above-described relationship (6), telecentricity of the second condenser lens unit is deteriorated. Accordingly, it is not desirable because resolution of the image projection apparatus is deteriorated.

It is further desirable that the image projection apparatus satisfies a following relationship (6A) or (6B).

$$0.85 \leq DR2/(FR2+F2) \leq 1.15 \quad (6A)$$

$$0.9 \leq DR2/(FR2+F2) \leq 1.1 \quad (6B)$$

An effective area of each optical modulation unit described above may be an area including all of a plurality of pixels included in each optical modulation unit or may be an area including only a predetermined pixel in the plurality of pixels. The predetermined pixel mentioned here may be, for example, an illuminated pixel in the plurality of pixels. Alternatively, a pixel actually used for optical modulation may be regarded as the predetermined pixel.

For example, the configuration is described in which the polarization separation units are arranged on the incident side of the fourth optical modulation unit or the first to the third optical modulation units. An absorption type or a reflection type polarizing plate may be arranged on at least one of the incident side and the exit side of the polarization separation unit so as to further enhance contrast.

In addition, the above-described polarization separation unit may be a prism type PBS and a wire grid type PBS, further may be a PBS including a mirror provided with an absorption type or a reflection type polarizing plate.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2017-155446, filed Aug. 10, 2017, which is hereby incorporated by reference herein in its entirety.

What is claimed is:

1. An image projection apparatus comprising:
   a light source unit configured to emit illumination light including first color light, second color light, and third color light of which wavelengths are different from each other;
   a first optical modulation unit configured to modulate the first color light;
   a second optical modulation unit configured to modulate the second color light;
   a third optical modulation unit configured to modulate the third color light;
   a fourth optical modulation unit as a transmissive liquid crystal panel unit configured to modulate the illumination light;
   a color separating-combining system configured to guide the first color light to the first optical modulation unit, to guide the second color light to the second optical modulation unit, to guide the third color light to the third optical modulation unit, and to combine light from the first optical modulation unit, light from the second optical modulation unit, and light from the third optical modulation unit; and
   an illumination optical system configured to illuminate the fourth optical modulation unit with the illumination light and to guide light from the fourth optical modulation unit to the color separating-combining system,
   wherein, in a case where a color separating unit arranged on a most light source unit side on an optical path from the light source unit to the color separating-combining system in color separating units included in the color separating-combining system is regarded as a front side color separating unit,
   the illumination optical system includes a polarization conversion unit configured to convert a polarization direction of the illumination light from the light source unit into a predetermined polarization direction and a reflection unit including a first mirror, a second mirror, a third mirror, a fourth mirror, a fifth mirror, and a sixth mirror which are arranged on positions different from each other,
   wherein the first mirror, the second mirror, and the third mirror are arranged on an optical path from the light source unit to the fourth optical modulation unit, and
   wherein the fourth mirror, the fifth mirror, and the sixth mirror are arranged on an optical path from the fourth optical modulation unit to the front side color separating unit.

2. The image projection apparatus according to claim 1, wherein the first mirror, the second mirror, the third mirror, the fourth mirror, the fifth mirror, and the sixth mirror are arranged so that a point at which optical paths cross one another exists on an optical path from the light source unit to the front side color separating unit.

3. The image projection apparatus according to claim 2, wherein the first mirror, the second mirror, the third mirror, the fourth mirror, the fifth mirror, and the sixth mirror are arranged so that there are two points at which optical paths cross one another on the optical path from the light source unit to the fourth optical modulation unit, and there are two points at which optical paths cross one another on the optical path from the fourth optical modulation unit to the front side color separating unit.

4. The image projection apparatus according to claim 1, wherein the first mirror, the second mirror, the third mirror, the fourth mirror, the fifth mirror, and the sixth mirror are arranged so that the first mirror and the sixth mirror are parallel to each other, the second mirror and the fifth mirror are parallel to each other, and the third mirror and the fourth mirror are parallel to each other.

5. The image projection apparatus according to claim 1, wherein in a case where a direction which light from the light source unit enters the first mirror is regarded as an incident direction, the first mirror, the second mirror, the third mirror, the fourth mirror, the fifth mirror, and the sixth mirror are arranged so that a line segment connecting a center of a predetermined mirror in the first mirror, the second mirror, the third mirror, the fourth mirror, the fifth mirror, and the sixth mirror and a center of a mirror to which light from the predetermined mirror enters via the fourth optical modulation unit crosses the incident direction.

6. The image projection apparatus according to claim 5, wherein in a case where a direction which the light from the light source unit enters the first mirror is regarded as the incident direction, the first mirror, the first mirror, the second mirror, the third mirror, the fourth mirror, the fifth mirror, and the sixth mirror are arranged so that a line segment connecting a center of the first mirror and a center of the second mirror does not cross the incident direction, a line segment connecting the center of the second mirror and a center of the third mirror does not cross the incident direction, a line segment connecting the center of the third mirror and a center of the fourth mirror crosses the incident direction, a line segment connecting the center of the fourth mirror and a center of the fifth mirror does not cross the incident direction, and a line segment connecting the center of the fifth mirror and a center of the sixth mirror does not cross the incident direction.

7. The image projection apparatus according to claim 5, wherein the first mirror, the second mirror, the third mirror, the fourth mirror, the fifth mirror, and the sixth mirror are arranged so that a point at which optical paths cross one another does not exist on an optical path from the light source unit to the front side color separating unit.

8. The image projection apparatus according to claim 5, wherein the first mirror, the second mirror, the third mirror, the fourth mirror, the fifth mirror, and the sixth mirror are arranged so that the first mirror and the sixth mirror are parallel to each other, the second mirror and the fifth mirror are parallel to each other, and the third mirror and the fourth mirror are parallel to each other.

9. The image projection apparatus according to claim 1, wherein, in a case where a direction which light from the light source unit enters the first mirror is regarded as an incident direction, the first mirror, the second mirror, the third mirror, the fourth mirror, the fifth mirror, and the sixth mirror are arranged so as to pass a plane orthogonal to the incident direction.

10. The image projection apparatus according to claim 9, wherein the first mirror and the second mirror are in a twisted relationship, and the fifth mirror and the sixth mirror are in a twisted relationship.

11. The image projection apparatus according to claim 9, wherein the first mirror, the second mirror, the third mirror, the fourth mirror, the fifth mirror, and the sixth mirror are arranged so that the first mirror and the sixth mirror are parallel to each other, the second mirror and the fourth mirror are parallel to each other, and the third mirror and the fifth mirror are parallel to each other.

12. An image projection apparatus comprising:
a light source unit configured to emit illumination light including first color light, second color light, and third color light of which wavelengths are different from each other;
a first optical modulation unit configured to modulate the first color light;
a second optical modulation unit configured to modulate the second color light;
a third optical modulation unit configured to modulate the third color light;
a fourth optical modulation unit as a reflective liquid crystal panel unit configured to modulate the illumination light;
a color separating-combining system configured to guide the first color light to the first optical modulation unit, to guide the second color light to the second optical modulation unit, to guide the third color light to the third optical modulation unit, and to combine light from the first optical modulation unit, light from the second optical modulation unit, and light from the third optical modulation unit; and
an illumination optical system configured to illuminate the fourth optical modulation unit with the illumination light and to guide light from the fourth optical modulation unit to the color separating-combining system,
wherein, in a case where a color separating unit arranged on a most light source unit side on an optical path from the light source unit to the color separating-combining system in color separating units included in the color separating-combining system is regarded as a front side color separating unit,
the illumination optical system includes a polarization conversion unit configured to convert a polarization direction of the illumination light from the light source unit into a predetermined polarization direction and a polarization separation unit configured to guide light from the polarization conversion unit to the fourth optical modulation unit and to guide light from the fourth optical modulation unit to the front side color separating unit and a condenser lens unit arranged between the polarization separation unit and the fourth optical modulation unit,
wherein light from the polarization conversion unit enters the fourth optical modulation unit via the condenser lens unit and light modulated by the fourth optical modulation unit enters the front side color separating unit via the condenser lens unit and the polarization separation unit.

13. An image projection apparatus comprising:
a light source unit configured to emit illumination light including first color light, second color light, and third color light of which wavelengths are different from each other;
a first optical modulation unit configured to modulate the first color light;
a second optical modulation unit configured to modulate the second color light;
a third optical modulation unit configured to modulate the third color light;
a fourth optical modulation unit as a transmissive liquid crystal panel unit configured to modulate the illumination light;
a color separating-combining system configured to guide the first color light to the first optical modulation unit, to guide the second color light to the second optical modulation unit, to guide the third color light to the third optical modulation unit, and to combine light from the first optical modulation unit, light from the second optical modulation unit, and light from the third optical modulation unit; and an illumination optical system configured to illuminate the fourth optical modulation unit with the illumination light and to guide light from the fourth optical modulation unit to the color separating-combining system, wherein, in a case where a color separating unit arranged on a most light source unit side on an optical path from the light source unit to the color separating-combining system in color separating units included in the color separating-combining system is regarded as a front side color separating unit, the illumination optical system includes a polarization conversion unit configured to convert a polarization direction of the illumination light from the light source unit into a predetermined polarization direction and a reflection unit including a first mirror, a second mirror and a third mirror, wherein the first mirror is arranged on a position different from that of the polarization conversion unit on an optical path from the light source unit to the fourth optical modulation unit, the second mirror is arranged on an optical path from the fourth optical modulation unit to the front side color separating unit, and the third mirror is arranged on the optical path from the fourth optical modulation unit to the front side color separating unit, wherein the optical path from the light source unit to the fourth optical modulation unit crosses an optical path from a mirror closer to the front side color separating unit of both the second mirror and the third mirror to the front side color separating unit.

* * * * *